Figure 2:
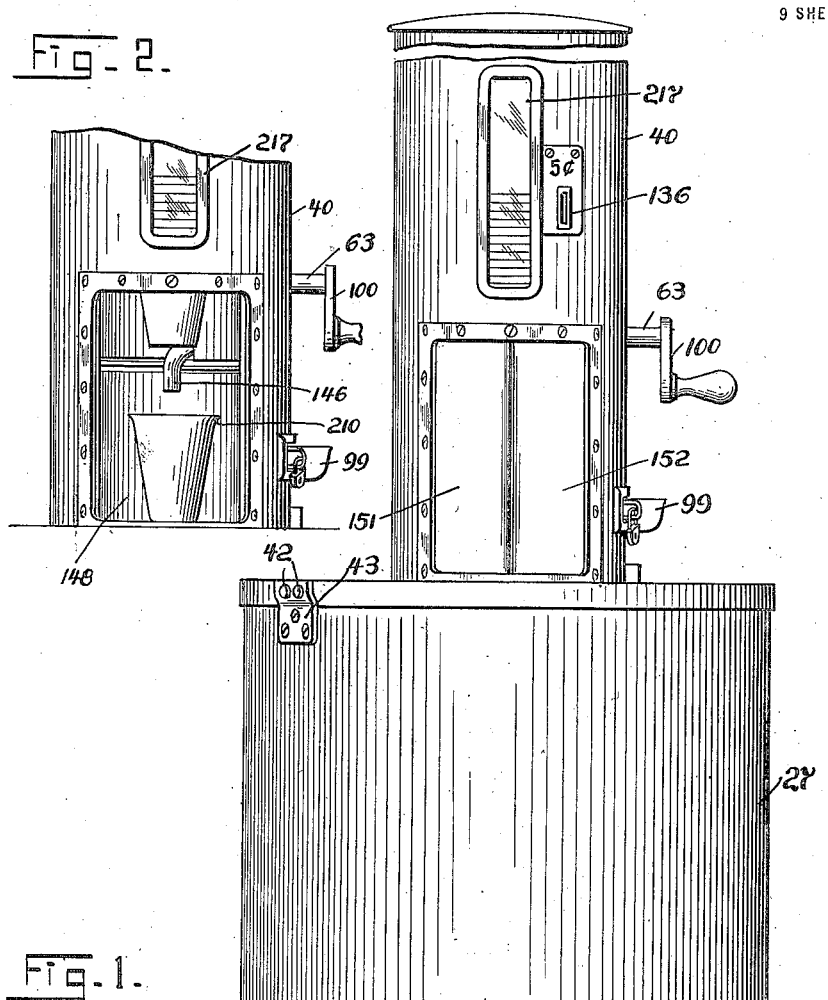

R. H. BAKER.
CUP AND BEVERAGE VENDING DEVICE.
APPLICATION FILED JUNE 21, 1918.

1,437,485.

Patented Dec. 5, 1922.
9 SHEETS—SHEET 1.

INVENTOR.
Rollyn H. Baker,
F. K. Fassett,
ATTORNEY

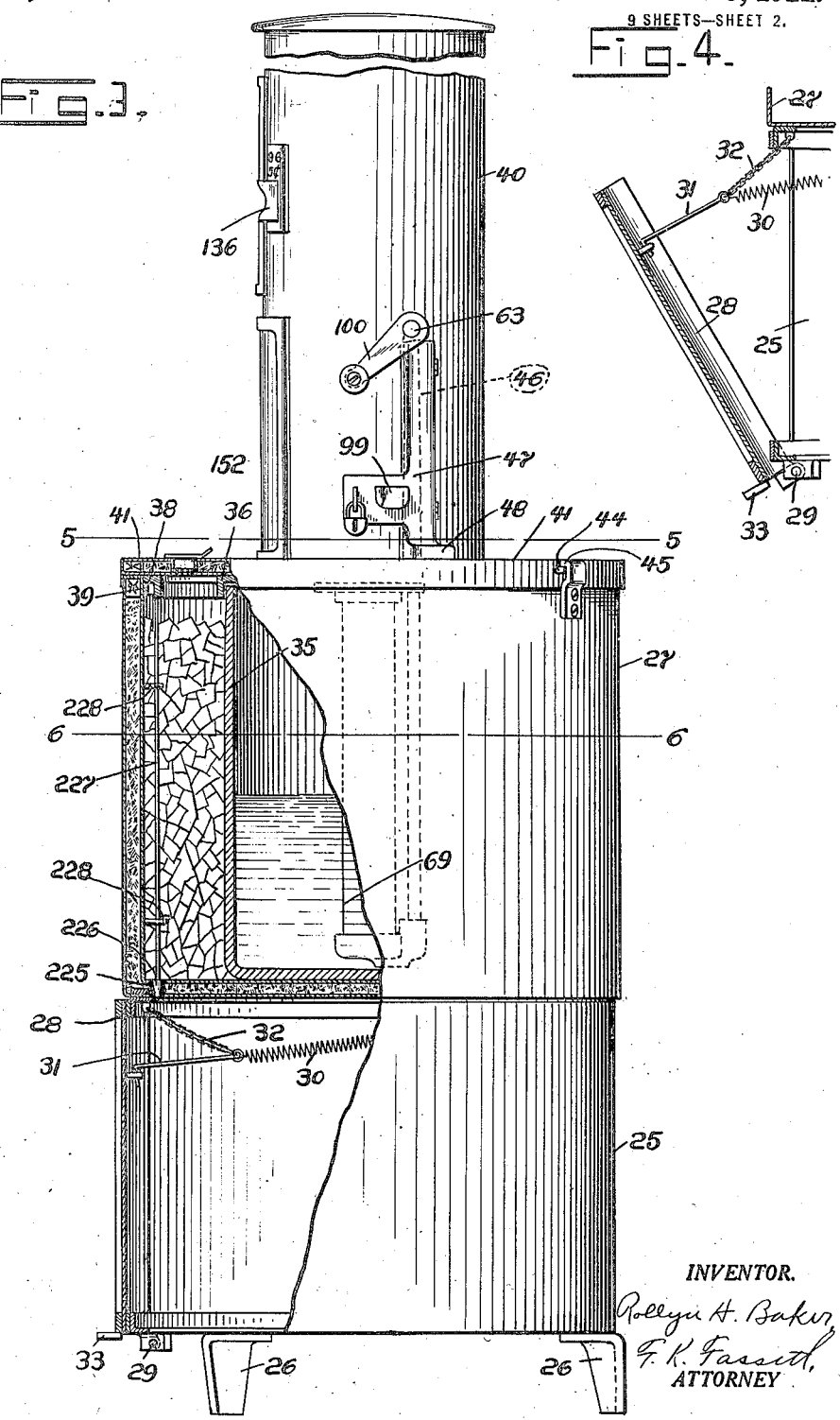

R. H. BAKER.
CUP AND BEVERAGE VENDING DEVICE.
APPLICATION FILED JUNE 21, 1918.

1,437,485.

Patented Dec. 5, 1922.
9 SHEETS—SHEET 3.

INVENTOR.
Rollyn H. Baker,
BY F. K. Farrett,
ATTORNEY.

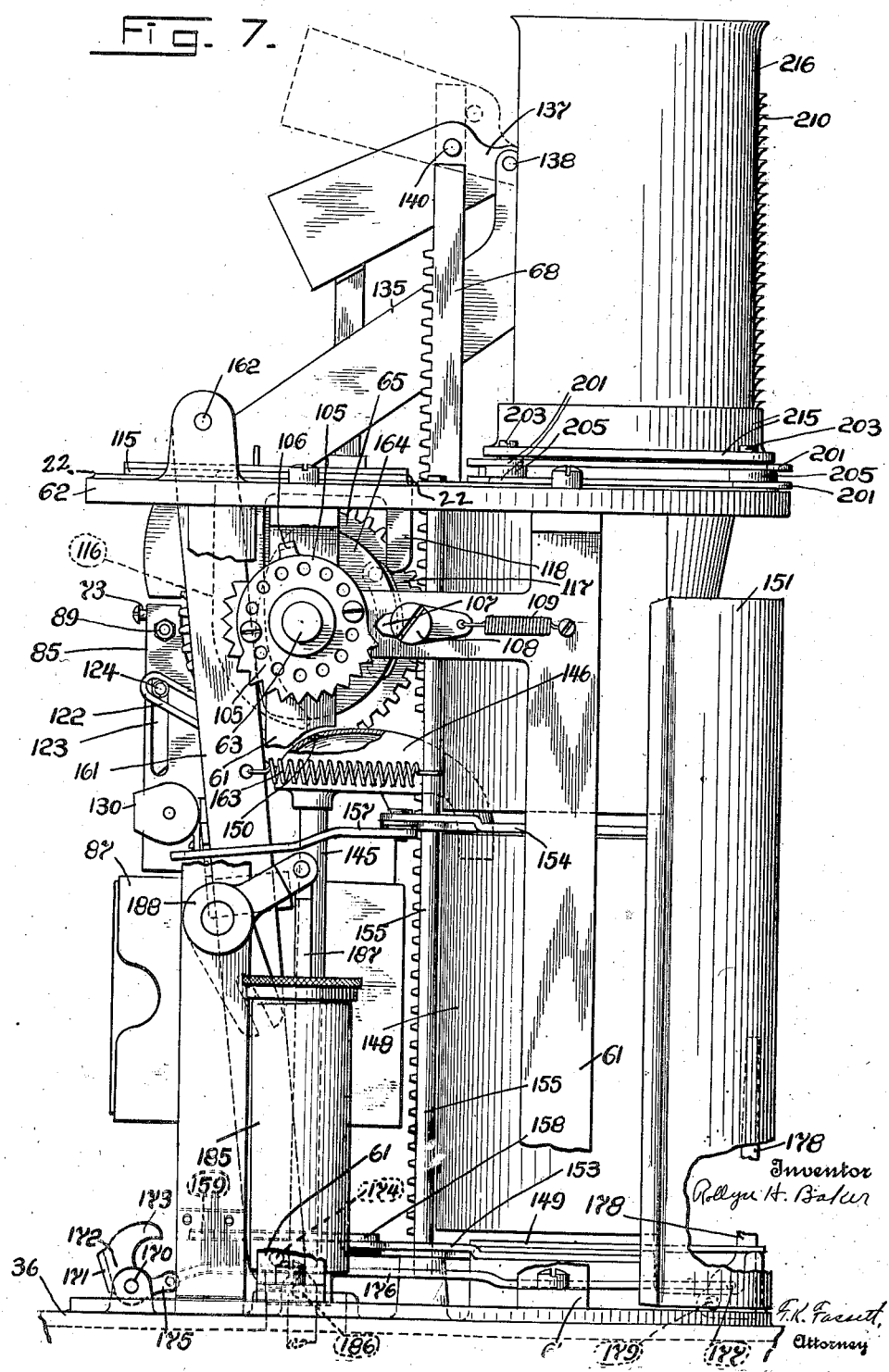

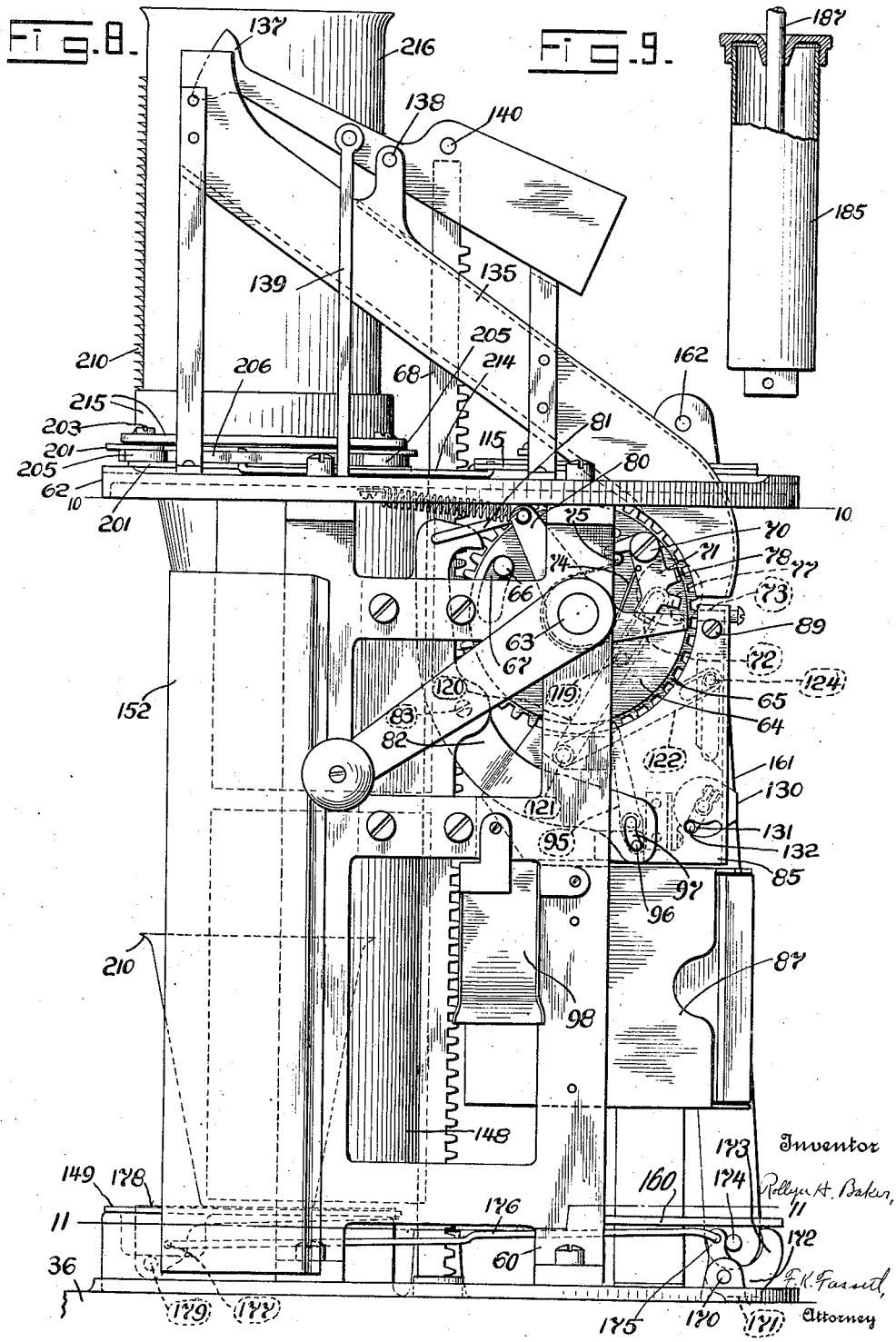

R. H. BAKER.
CUP AND BEVERAGE VENDING DEVICE.
APPLICATION FILED JUNE 21, 1918.

1,437,485.

Patented Dec. 5, 1922.

9 SHEETS—SHEET 6.

Inventor
Rollyn H. Baker
F. K. Fassett
Attorney

R. H. BAKER.
CUP AND BEVERAGE VENDING DEVICE.
APPLICATION FILED JUNE 21, 1918.

1,437,485.

Patented Dec. 5, 1922.

9 SHEETS—SHEET 7.

Inventor
Rollyn H. Baker,
F. K. Fassett.
Attorney

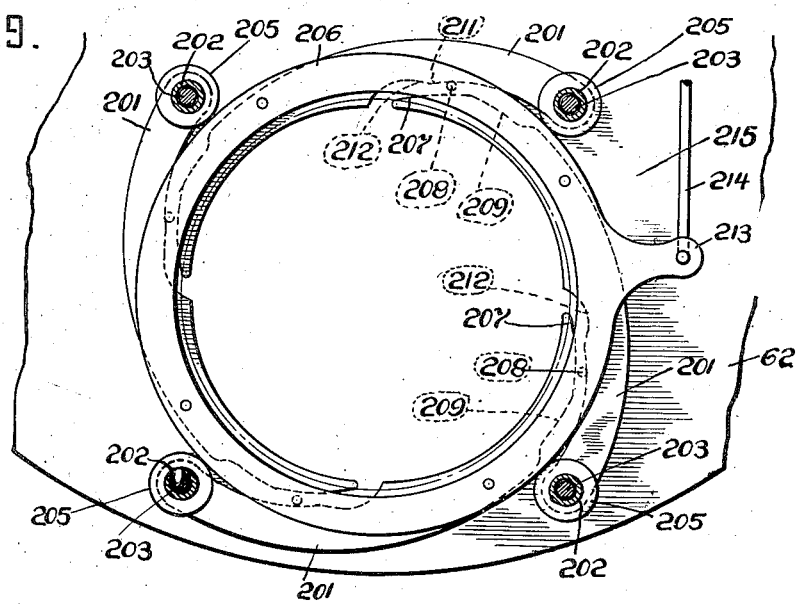
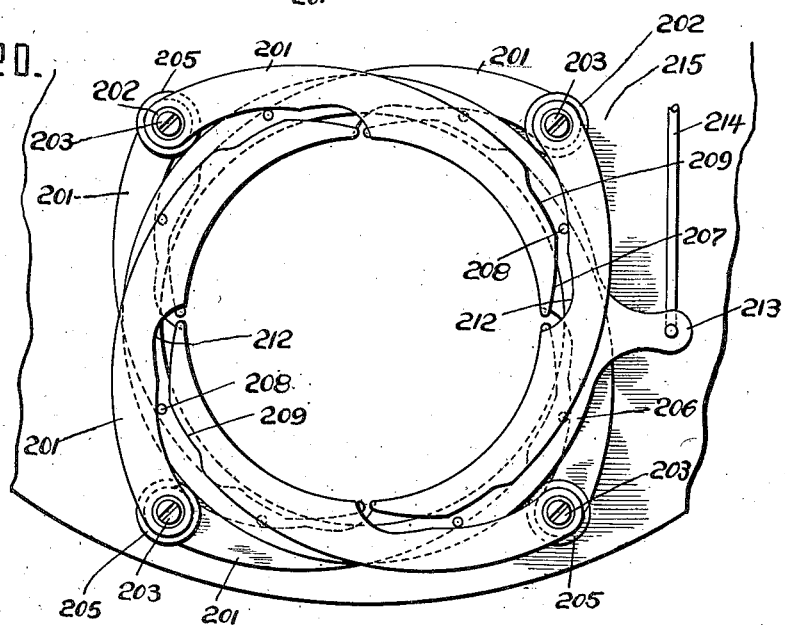

R. H. BAKER.
CUP AND BEVERAGE VENDING DEVICE.
APPLICATION FILED JUNE 21, 1918.
1,437,485.
Patented Dec. 5, 1922.
9 SHEETS—SHEET 9.
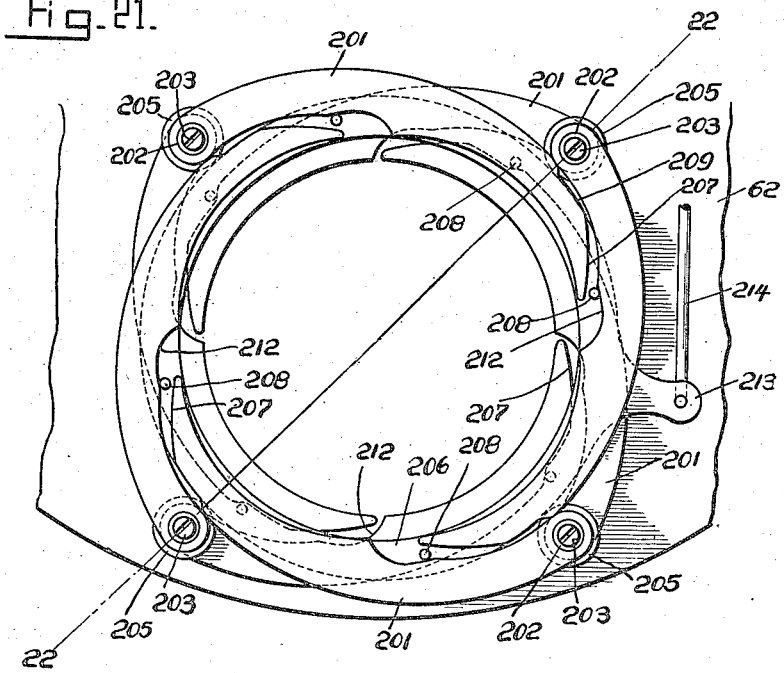
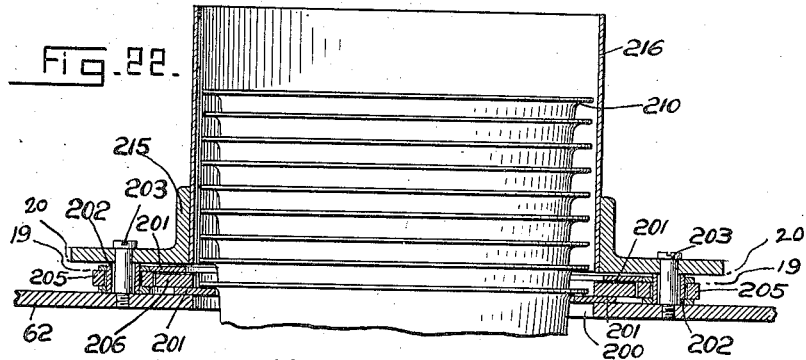
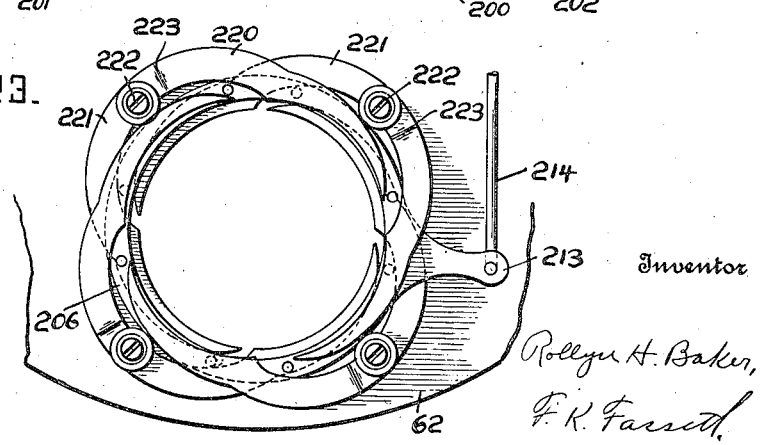
Inventor
Rollyn H. Baker,
F. K. Farrett
Attorney Patented Dec. 5, 1922.

1,437,485

UNITED STATES PATENT OFFICE.

ROLLYN H. BAKER, OF DAYTON, OHIO, ASSIGNOR TO THE BAKER MANUFACTURING COMPANY, OF DAYTON, OHIO, A CORPORATION OF OHIO.

CUP AND BEVERAGE VENDING DEVICE.

Application filed June 21, 1918. Serial No. 241,131.

*To all whom it may concern:*

Be it known that I, ROLLYN H. BAKER, a citizen of the United States, residing at Dayton, in the county of Montgomery and State of Ohio, have invented a new and useful Cup and Beverage Vending Device, of which the following is a specification.

While my invention is primarily an improved device for vending a cup and a quantity of beverage for a single sum and embraces useful improvements in such combined devices, it also comprises various novel features and improvements which are applicable to cup vending devices and beverage vending devices, respectively. Among the several novel or improved features is that of enclosing the beverage spout and the cups in a compartment having a door which opens and closes automatically at appropriate times when a purchase is being made, but which is normally closed and locked, thereby excluding dust and flies and protecting the delivery department generally. Another novel feature is a closed compartment for the reception of used cups, this compartment being at the bottom of the device and provided with a self closing door which may be opened by the customer with his foot without stooping. This, too, is in the interest of sanitation, keeping the soiled cups, which are apt to be more or less covered with the sweet beverage, out of the reach of flies. These features contribute enormously to the commercial success of the device, as it may easily be kept neat and clean in appearance and perfectly sanitary, so as to be attractive to the most fastidious of persons, instead of being unattractive and disgusting, as would otherwise be the case in a device of this sort. Moreover, it gives the device entrée into many places where it would not be tolerated were it the attraction for flies that such devices usually are. The vending compartment door is arranged to open during a portion of a cycle of operation of the vending device and though means is provided for closing the door upon the completion of the cycle other means is also provided for preventing the door closing until the purchase has been removed from the compartment. All of these provisions are automatic in operation and require no attention whatever on the part of the customer.

Another novel feature is the manner of vending the cups. Instead of throwing the cup at the customer, as is done in some devices, or disengaging it from the stack and depositing it in a dirty receptacle, the machine simply affords an opportunity for the customer to detach one cup from the bottom of the stack. The cup, particularly its interior, is perfectly clean and sanitary, it having been maintained so by the cup which has till then been inside of it. The exterior of the cup has also been kept clean and sanitary by being confined in the compartment, the upper portion of the exterior, that with which the lips come in contact in drinking, having been further protected by remaining enclosed in the cup container till just before it is taken by the customer. Although when a customer detaches his cup from the stack the next cup is in view and in substantially the same position which was occupied by the detached cup, the customer cannot remove the next one, it being securely held by the mechanism.

The operation of the device from the customer's point of view is briefly this: The customer inserts a coin of the required kind and turns the crank toward himself as far as it can be turned, this being about one-half of a revolution. During this operation the door of the delivery compartment opens, exposing the spout, and a cup suspended just above the spout. This is the bottom one of a stack of nested cups and at this time is held solely by friction between itself and the next cup. The customer therefore simply grasps the cup and detaches it from its neighbor. He then sets the cup under the spout and returns the crank to the original position, this action operating a pump and filling the cup with the beverage contained in the reservoir. While the cup remains in the compartment the doors remain open, but removing the cup releases the door operating mechanism and the doors close, slowly however, being controlled by a fluid dash pot. When the doors close they automatically lock. Should a person attempt to operate the machine with a slug, or even a good coin which is undersize, the slug or coin will fail to unlock the machine and the slug will be returned to the operator. Should the person operating the machine elect not to detach the cup the stack remains as it is during the remainder of the operation and upon the next operation of the machine the status of the cups is just as if the cup had been removed at the last operation. That is, the bottom cup, the one which might have been removed at the previous operation, is subject to removal, but all of the others are secured against removal. In like manner the machine may be operated any number of times without removing the cups, the cups remaining in status quo.

Figure 1:
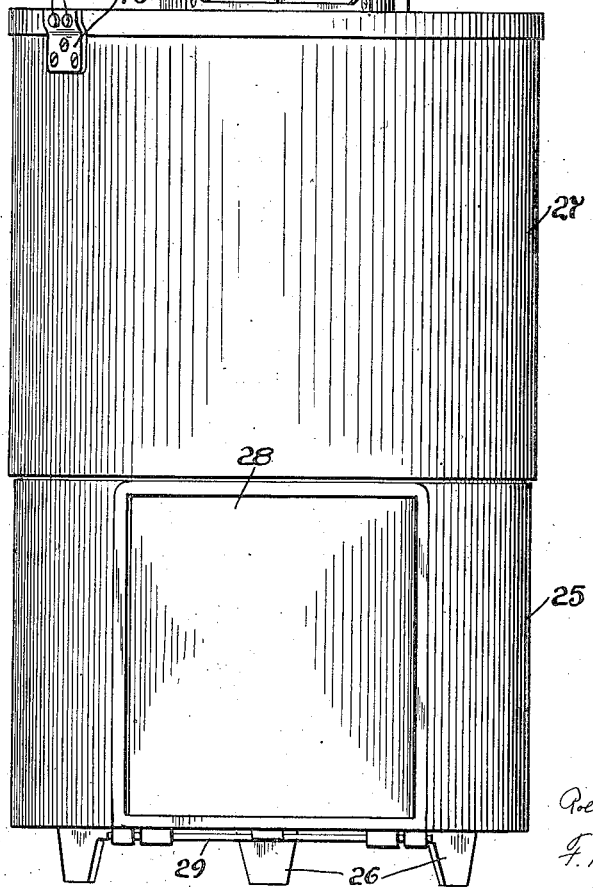
Figure 5:
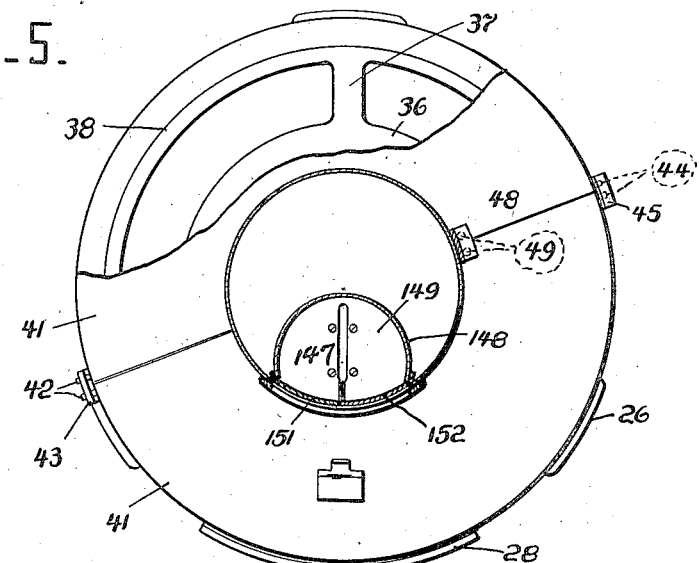
Figure 6:
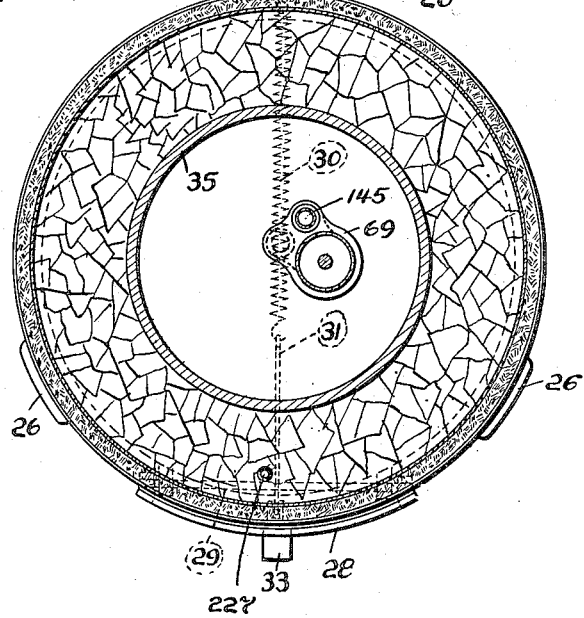
Figure 10:
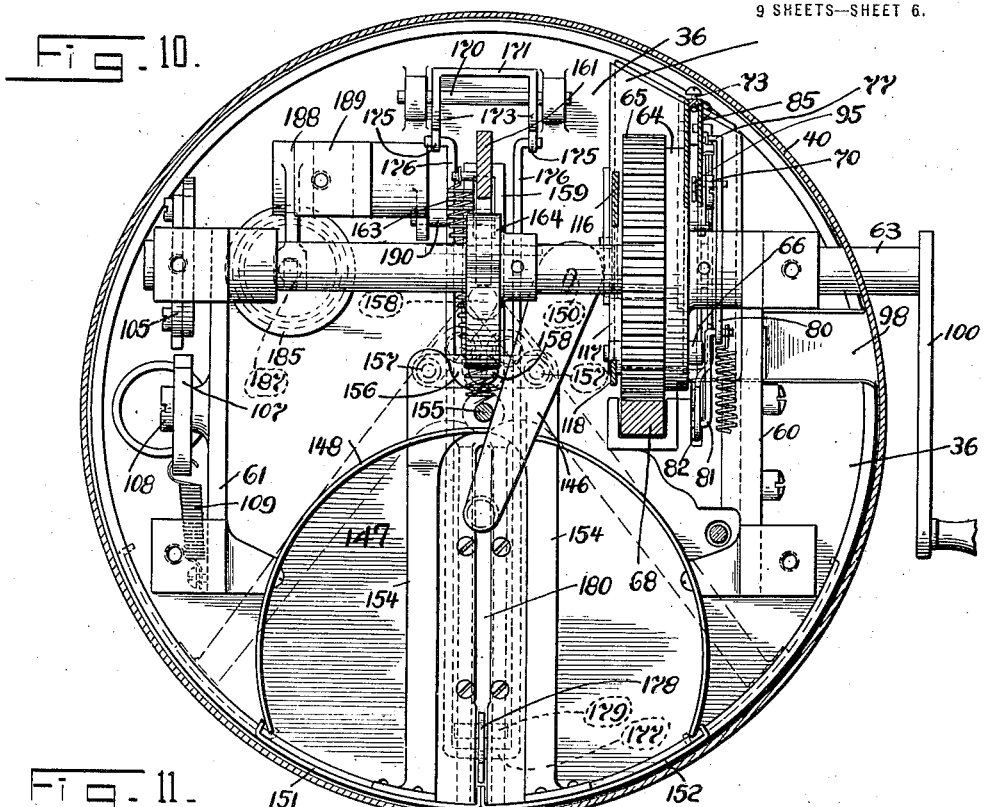
Figure 11:
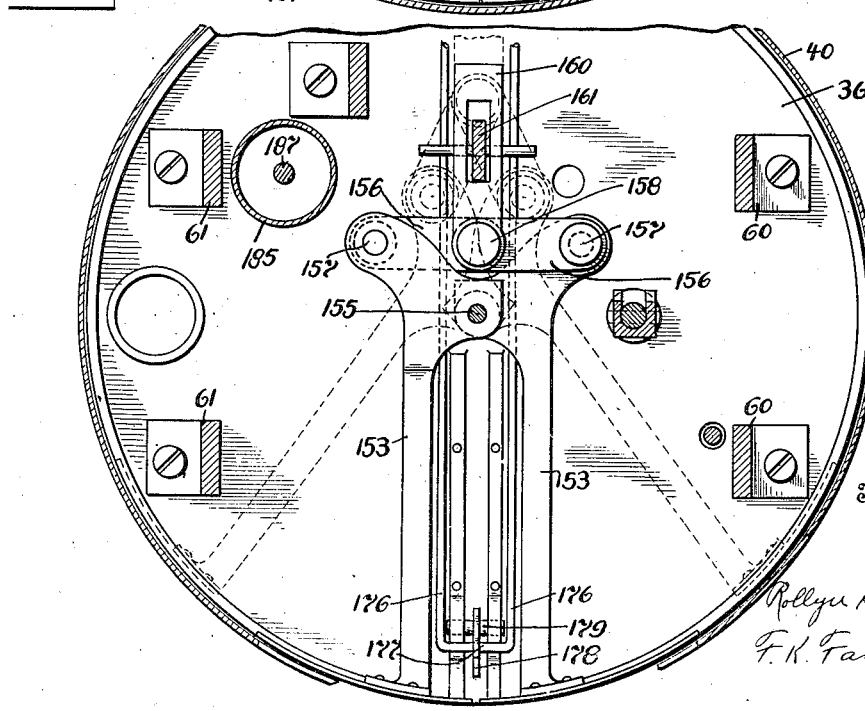
Figure 12:
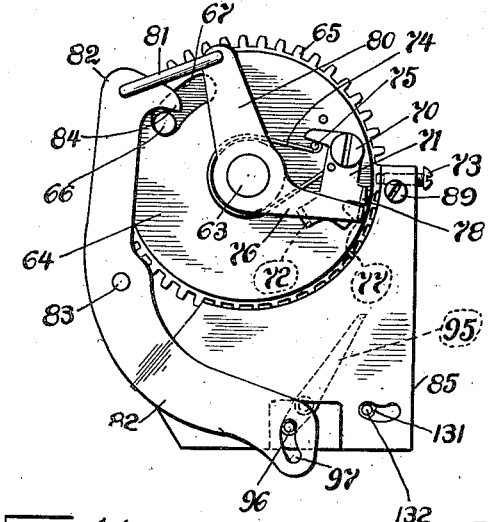
Figure 13:
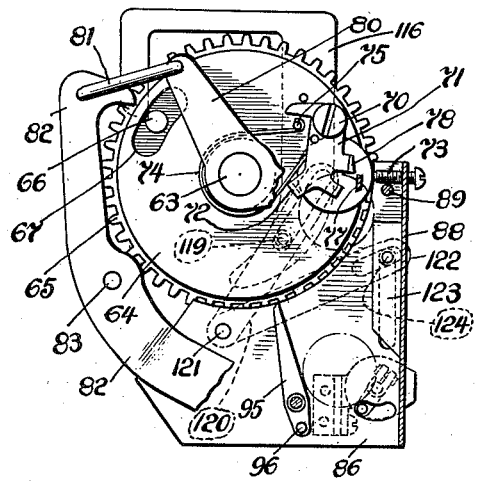
Figure 14:
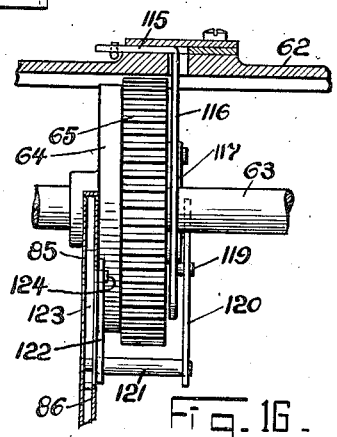
Figure 15:
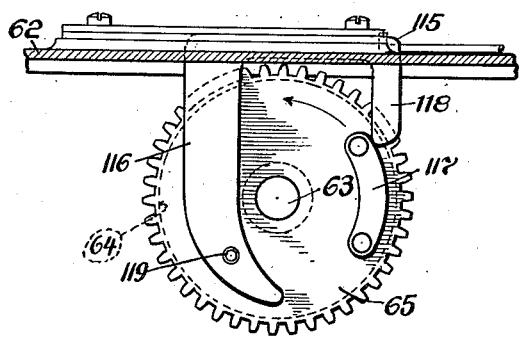
Figure 16:
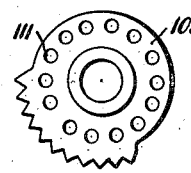
Figure 17:
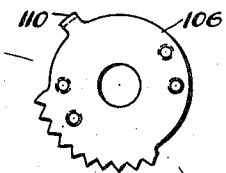
Figure 18:
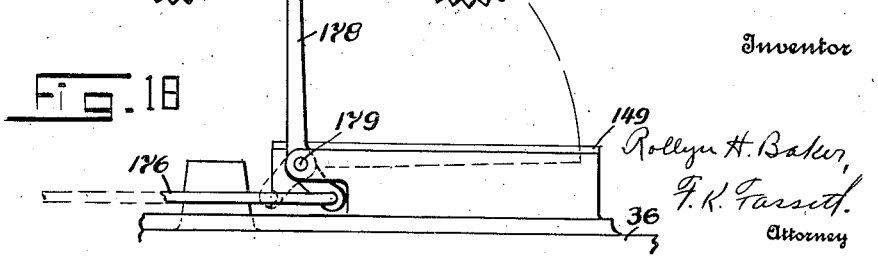

In the accompanying drawings, Figure 1 is a front elevation of my machine. Fig. 2 is a fragmental view showing the delivery door open and a cup standing under the spout. Fig. 3 is an elevation of the right hand side of the machine, portions being broken away to disclose the construction. Fig. 4 is a fragmental view showing the door of the discarded-cup receptacle open. Fig. 5 is a sectional plan view taken on line 5—5 of Fig. 3. Fig. 6 is a sectional plan view on line 6—6 of Fig. 3. Fig. 7 is a left side elevation of the dispensing mechanism. Fig. 8 is a right side elevation of the dispensing mechanism. Fig. 9 is a detail of the dash pot seen in Fig. 7. Fig. 10 is a sectional plan view taken on line 10—10 of Fig. 8. Fig. 11 is a sectional plan view taken on line 11—11 of Fig. 8. Figs. 12 and 13 are somewhat similar views showing certain structural details in the coin mechanism. Fig. 14 is a fragmental rear elevation showing the operating shaft and certain parts associated with it. Fig. 15 is a fragmental left side elevation of parts shown in Fig. 14. Figs. 16 and 17 are the two toothed plates which combine to form the disk of the full stroke device. Fig. 18 is a fragmental view of the lever and connecting link by which the door is maintained in open position while the cup remains on the seat. Fig. 19 is a sectional plan view of the cup dispensing mechanism, the section being taken on line 19—19 of Fig. 22, the parts composing the upper expansible ring being removed. Fig. 20 is a plan view of the cup dispensing mechanism taken on line 20—20 of Fig. 22; in this view the upper expansible ring is contracted and the lower one expanded. Fig. 21 is a view similar to Fig. 20 but with the upper ring expanded and the lower one contracted. Fig. 22 is a sectional elevation taken on line 22—22 of Fig. 7. Fig. 23 is a modified form of cup dispensing mechanism.

Similar numerals refer to similar parts throughout the several views.

Referring now more particularly to Figs. 1 to 6 inclusive, 25 is a discarded-cup receptacle which is provided with short legs 26. Mounted on the receptacle 25 is the ice chamber 27 which, together with the discarded-cup receptacle, forms the main body of the machine. The receptacle 25 is provided with a door 28 hinged at 29. This door is normally held in closed position by a spring 30, one end of the spring being anchored in the rear of the receptacle, the other end being secured to the inside of the door by hook 31. A short piece of chain 32, one end of which is attached to the hook and the other end to a lug depending from the top of the receptacle, limits the movement of the door as is well illustrated in Fig. 4. A pedal 33 projects from the lower edge of the door and when the customer desires to open the door to deposit a discarded cup he sets his foot on the pedal and presses downward, thus opening the door as seen in Fig. 4. The limiting chain 32 serves to prevent the door moving far enough so that its upper edge may strike the customer on the shin. When it is desired to open the door wide for the purpose of removing the cups or in order to set a bucket in the receptacle to receive water drained from the ice chamber, the hook 31 may be detached from the door. When this is done the chain 32 supports the outer end of the spring 30, and the hook, and keeps the latter in a position where it may be readily grasped by the attendant when he wishes to attach it to the door.

The ice chamber has an insulated bottom and side walls as is clearly shown in Figs. 3 and 6. Inside of the ice chamber is a reservoir 35 which rests on the insulated bottom of the chamber. The reservoir is considerably smaller in diameter than the chamber so as to leave a sufficient surrounding space for ice. A base plate 36 fits down over the reservoir and holds the upper portion thereof in position. This plate has radiating arms 37 which unite the plate to a ring 38. This ring rests on lugs 39 secured at intervals to the inside of the ice chamber (see Fig. 3). The plate serves as a base and main support for the dispensing mechanism which will be described presently. This mechanism is enclosed in a tall hood 40. The ice chamber and such portion of the base plate 36 as is not covered by the hood 40 is covered by a pair of insulated segmental covers 41—41, the two combined forming an annulus as is shown in Fig. 5. Each of these covers has a stud 42 projecting from its periphery close to the point where it joins the other cover. These studs project through apertures in an ear 43 secured to the ice chamber, one side of each of the segments being thereby secured to the ice chamber. At the opposite side of each segment, also close to the point where the segments join, is a similar stud 44. These studs slide under an ear 45 secured to the ice chamber and are thus held down to the chamber. The hood 40 has a vertical slot, 46 seen in dotted lines in Fig. 3, extending from the lower edge of the hood up to the operating shaft, this slot permitting the hood to be lifted upward for the purpose of removal. In order to prevent the hood being lifted this slot is covered by a hinged flap 47 which, when swung into place over the slot as in Fig. 3, prevents the hood being lifted off. This flap is held in position over the slot by a padlock. At its lower end the flap is provided with a housing 48. Each of the segments 41 is provided with an upwardly extending stud 49 so positioned as to come within the housing 48 when the flap is closed. This confinement of the studs in housing prevents the segments being moved apart, and since the studs 44 are held down by the ear 45 it is seen that the segments are securely locked to the ice chamber. The several parts of the machine are thus securely locked with a single lock.

Mounted on the base plate 36 is a right side plate 60 and a left side plate 61, which plates support an upper base plate 62. Mounted in bearings in the plates 60 and 61 is an operating shaft 63. This shaft carries a disk 64 which is rigidly secured thereto. A spur gear 65 is loosely mounted on the shaft but is rotated with the shaft by a stud 66 set in the gear and projecting through an arcual slot 67 in the disk 64. This arrangement allows a limited movement of the shaft without moving the gear. Enmeshed with the gear is a rack bar 68 which is attached at its lower end to the piston of a pump 69 submerged in the liquid contained in the reservoir. Pivotally mounted on the disk 64 at 70 is a coin holder 71. This coin holder is in reality a small lever mounted a sufficient distance from the disk to admit a coin between itself and the disk. Projecting inwardly from the outer end of this lever; that is, projecting toward the disk, is a small lug 72. In the plane which is occupied by a coin when it is in the holder is a stud 73 carried by a stationary portion of the machine (see Fig. 13). When the disk 64 is in normal position, as in Fig. 8, a coin dropped into the chute falls into the space between the lever 71 and the disk and lodges on the lug 72 and the end of the stud 73. A coin in this position is indicated by a dotted circle in Fig. 8. Between the lever 71 and the disk there is a washer (not shown) of about the same diameter as the screw 70 by which the lever is secured to the disk. The lever 71 is pressed toward the periphery of the disk by a spring 74, its movement in this direction being limited by a stud 75. When the shaft 63 starts to rotate, clockwise as seen in Fig. 8, the coin is pushed downward past the end of the stud 73. (See Fig. 13). The position of the stud is so adjusted that in order to permit the coin to pass the stud the lever 71 must swing toward the axis of the shaft. Loosely mounted on the shaft is a lever 76 having an inwardly projecting lug 77. Projecting outwardly from the lever 71 is a lug 78. A portion of the lever 76 is broken away in Fig. 13 but the lug 77 is shown in section in this view. It is seen that the coin which is now opposite the stud 73, has swung the lever 71, or coin holder as I have previously called this lever, toward the shaft 63 such a distance that the lug 78 will pass the lug 77 without touching it.

Referring to Fig. 12, where the shaft 63 has been rotated some distance without there being a coin in the holder, it will be seen that the lug 78 has engaged the lug 77 and that the lever 76 has been moved downward some distance. Attached to the lever 76 is an arm 80 which arm is connected by a link 81 to a lever 82 pivoted at 83. This lever has a lug or hook 84 projecting from its side which, when the lever 82 is rocked as in Fig. 12, is adapted to move into the path of the stud 66 carried by the gear 65. Therefore, when the shaft 63 is rotated without a coin in the holder the lug 78 engages the lug 77, rocks the lever 76, thereby drawing the hook 84 into the path of the stud 66 and arrests the shaft 63 as soon as the end of the slot 67 engages the stud 66 and the stud impinges the hook 84. If there is a coin in the holder, as in Fig. 13, the holder is swung so that its lug 78 will clear the lug 77 and the locking mechanism is not brought into action. After the coin passes the stud 73 it drops into a chute composed of walls 85 and 86, whence it passes to the coin box 87. The walls 85 and 86 are united by a transverse wall 88 which has a threaded aperture into which the stud 73 is screwed. The stud can be screwed in or out and by this means the size of the coin which will be required to prevent the lug 77 being engaged by the lug 78 may be predetermined; that is, the stud may be set so that if a coin of less than a given diameter be inserted it will fail to rock the lever 71 far enough to swing the lug 78 clear of the lug 77, in which case the locking device will be brought into action just as though there were no coin in the holder. When the stud 73 has been correctly set it can be secured in that position by a clamping screw 89, whereby the walls 85 and 86 are drawn together against the stud.

A deflector 95 is pivotally mounted between the walls 85 and 86, and from the lower end of this deflector there projects outward a stud 96 which passes through a slot 97 in the lower end of the lever 82. When the lever 82 is in normal position, as in Fig. 8, the deflector is thrown to the left as seen in Figs. 8, 12 and 13, and when in this position the coin is compelled to pass to the right of the deflector. When the locking device is thrown into action as in Fig. 12 the cam shaped margin of the slot 97 throws the deflector to the right, the deflector then directing the coin to a chute 98 (see Figs. 8 and 10) whereby the coin is carried to an open receptacle 99 formed on the flap 47. By this means rejected coins are returned to the customer. The shaft 63 is operated by a crank 100 which is shown in normal position in Fig. 8. When the shaft is arrested by the locking device, either because no coin has been inserted or because the coin is too small in diameter, the crank is approximately horizontal and its weight is sufficient to return the disk and shaft to their normal positions as soon as the operator's hand is removed from the crank.

Rigidly secured to the end of the shaft is a plate 105 and secured to said plate by screws is a second plate 106. Each of these plates has teeth adapted to engage a pawl 107 which is pivotally mounted at 108 and capable of rocking in either direction from a median line. The pawl is held in the median position by a spring 109 (see Fig. 7). The face of the pawl has a width equal to the thickness of both plates, and as the shaft revolves the pawl rocks one way or the other to allow the teeth to pass, but the length of the pawl is so proportioned that until the last tooth has passed the pawl the pawl cannot return to the median position and therefore cannot reverse and allow the shaft to turn the other way. The disk 106 carries a stop lug 110 adapted to engage a fixed lug on the frame 61 and limit the movement of the shaft. The plate 105 is provided with a plurality of holes 111 so that it can be secured to the plate 106 in any one of a number of positions. The relationship between the stop lug 110 and the last tooth on the plate 106 remaining fixed, it follows that whatever position the plate 106 occupies with reference to plate 105 the last tooth will be in the proper position with reference to the pawl 107; that is, will have passed sufficiently beyond the pawl 107 to permit the pawl to reverse at the time the lug 110 engages the lug on the frame. It is seen therefore that in varying the stroke of the shaft the range of the full stroke device is simultaneously varied the proper amount. The full stroke device is so timed that the first tooth will not pass the pawl until after the stud 66 carried by the gear has moved beyond the point at which it is liable to be arrested by the lever 82, so that the full stroke device does not come in play when the crank is moved without a coin having been inserted, or in case the coin is too small. Since this idle movement does not effect the rack bar; that is, since there is practically no movement of the gear 65 when the locking device comes into action, operating the crank without inserting a coin does not actuate the pump.

Mounted on the upper base 62 is a sliding member 115, this member being secured by suitable guides. Depending from the member 115 is an arm 116 in close proximity to the gear 65. Secured to the gear 65 is an arcual lug 117 (see Fig. 15) adapted, as the gear rotates, to engage the arm 116 and move the sliding member 115 in one direction. Depending from the member 115 is a second arm, 118, and upon the return of the gear to normal position the lug 117 engages the arm 118 and returns the slide 115 to its former position. Projecting from the arm 116 is a roller 119 which runs in a slot in a lever 120 rigidly secured to a rock shaft 121. This shaft is mounted in suitable bearings (not shown). Rigidly secured to the other end of the shaft is an arm 122. Between the walls 85 and 86 is a sliding bar 123 carrying a stud 124 which plays in the slot in the end of arm 122. Each time the sliding member 115 moves to the left, as seen in Figs. 7 and 15, the rock shaft 121 is rocked, causing the sliding bar 123 to move downward. Upon the return of the member 115 to its original or normal position, the sliding bar 123 is raised to its original position.

Adjacent to the wall 86 a counter 130 is mounted. This counter has an operating arm 131 carrying a stud 132 which projects through a slot in the wall 86 into the space between walls 85 and 86. Referring to Fig. 13, it will be seen that the stud 132 lies in the path of the coin. When the coin falls from the holder 71 it is arrested by the deflector 95 and stud 132. Upon the downward stroke of the sliding bar 123 it engages the coin and pushes it downward, the coin in turn thrusting the stud 132 aside and thereby rocking the arm 131. After the coin has passed the stud 132 the bar 123 continues its downward movement until its lower edge, which is oblique, engages the stud 132 and rocks the arm 131 back to the position it occupies in Fig. 13. This operation registers 1 on the counter, and in this manner all of the coins which pass to the coin box are registered.

The inner coin chute 135 terminates at its upper end in a position where it will register with the outer coin chute 136 when the hood is in place over the mechanism; the outer coin chute being carried by the hood and the inner one by the upper base 62. At its lower end the inner coin chute terminates opposite the holder 71 so that a coin dropped into the chute finds its way to the holder. A slot closer 137 is pivotally mounted at 138 and arranged to rock downward so as to prevent a coin entering the slot. The slot closer is held in an elevated position by a rod 139 which extends down into the reservoir where it carries a float (not shown). As long as there is a sufficient quantity of liquid in the reservoir the float tends to keep the slot closer elevated. The slot closer carries a stud 140 which extends laterally into the path of movement of the rack bar 68. Upon the first part of the upward movement of the rack bar it engages this stud and lifts it to the position shown in dotted lines in Fig. 7. This rocks the slot closer down and closes the slot, the float being forced downward in the liquid. As soon as the rack bar returns to its normal position the float lifts the slot closer so another coin may be inserted.

As before stated, the rack bar is attached to the piston of a pump 69 submerged in the liquid in the reservoir. An extended description of the pump is not necessary and it will be sufficient to say that upon operation of the crank 100 the rack bar is lifted to the extent permitted by the adjustment of the plate 106 of the full stroke device. This raises the piston of the pump and allows liquid to flow into the cylinder through a suitable valve. Upon the downward stroke of the rack the liquid in the cylinder is forced upward through a vertical tube 145 (see Figs. 6 and 7). The upper end of tube 145 carries a spout 146 which extends toward the front of the machine and finally downward. Referring more particularly to Fig. 10, it will be seen that the spout terminates in a compartment 147 which is formed by a curved plate 148 secured to lugs on the side plates 60 and 61. The bottom of this compartment 149 (see Figs. 5 and 7) is level and affords a seat upon which to set a cup under the spout. Referring to Fig. 7, it will be noted that the spout has a considerably larger cross sectional area than the riser 145. By this means the velocity of flow from the spout is very much reduced so that even if the crank is operated rapidly the fluid will not issue from the spout rapidly enough to splash. In order to empty the spout immediately the liquid ceases to rise in the tube 145, a vent 150 is provided in the upper part of the spout. (See Figs. 7 and 10). Because of the large area of the spout relative to the area of the riser 145 and the resulting sluggishness of the flow, no liquid is forced thru this vent. However, to reduce the probability of fluid being forced out at the vent the vent is bored thru the wall of the spout obliquely so that it extends more or less in the direction of the flow of the liquid.

The compartment 147 is provided with a door which in the present case is composed of two parts, 151 and 152, each of which is supported by a lower hinge arm 153 and an upper hinge arm 154. (See more particularly Figs. 10 and 11.) These arms are mounted to rotate on a central shaft 155 so that the sections of the door, which are cylindrical in form, can swing close to but without touching the inside of the hood. (See Fig. 10). Each of the hinge arms has an extension projecting beyond the axial shaft 155, these extensions being connected together by toggles composed of links 156 pivoted at 157 to the extensions and united by knuckle joints 158, the parts being so proportioned that when the links 156 are in alignment, so that the axes of the knuckles 158 pass through a straight line drawn through the axes of the pivots 157, the hinge arms will have been swung toward each other to such an extent as to bring the two parts of the door together at the center of the opening to the compartment 147. When the toggle alignment is thus established the toggles act as locks and prevent the door being opened. Attached to the upper knuckle is a link 159 and to the lower knuckle a similar link 160. A lever 161 pivoted to the upper base 62 at 162 extends downward and passes through slots in links 159 and 160; a spring 163, one end of which is attached to the lever 161 and the other end to the axial shaft 155, tends to draw the lever toward the axial shaft and in doing so to move the toggles into alignment, thereby closing and locking the door. Rigidly attached to the shaft 63 is a cam 164 whereby, when the shaft is rotated, the lever is swung to the position shown in Fig. 8. This movement of the lever breaks the toggles; i. e., pulls the knuckles 158 out of alignment with the pivots 157 and draws the extensions of the arms 153 and 154 toward each other, thereby swinging the arms apart and opening the door; the parts then occupying the position shown in Figs. 10 and 11 in dotted lines.

Pivoted on the base plate 36 at 170 is a retaining pawl comprising a base portion 171 and two upturned flanges 172. Extending from each of these flanges is an arm 173. At the lower end of the lever 161 is a transversely disposed pin 174 which, when the lever is thrown rearwardly by operation of the crank, engages the arms 173 and rocks the retaining pawl to the position shown in Fig. 8. Each of the flanges 172 carries a second arm, 175, to which is connected one tine of a forked link 176, the other end of said link being attached at 177 to a lever 178, this lever being pivoted to the base 136 at 179. When the parts are in normal position the lever 178 stands erect as in Fig. 7, but when the lever 161 is thrown rearwardly upon operation of the crank and the retaining pawl is rocked to the position shown in Fig. 8, as above described, the lever 178 is rocked downward into a horizontal position as shown in Fig. 8, the upper edge of the lever being approximately flush with the surface of the seat 149 so that a cup standing on the seat (see Fig. 8) is adapted to hold the lever in its reclining position. The seat 149 is provided with a slot 180 in which the lever 178 lies when in its reclining position and which permits the lever to rise to its erect position. With the retaining pawl in the position shown in Fig. 8 the arms 175 are in the path of the pin 174 and adapted to arrest the pin and hold the lever in its rearward position in opposition to the tendency to move which is imparted to it by the spring 163. It will be noted that the point at which the link 176 is pivoted to the lever 178 is not much removed from a straight line drawn from the point where the link 176 attaches to the arms 175 and the axis 179 on which the lever 178 rocks. On this account, although the spring 163 may have considerable tension, the tendency to lift the lever 178 from the position it occupies in Fig. 8 is rather slight, which enables a very small weight resting on the seat 149 to hold the lever down.

The operation of the machine from the customer's point of view is as follows: Having inserted his coin he turns the crank 100, clockwise as seen in Fig. 8, until it comes to a stop. This raises the rack 68, thus closing the slot, fills the pump with liquid, and opens the door, the lever 178 then being found in the position it occupies in Fig. 8; securing a cup (in a manner to be hereinafter described) he sets it on the seat under the spout. He then turns the handle counterclockwise to its original position. Although the lever 161 is now no longer maintained in its rearward position by the cam 164 the spring 163 is prevented from moving the lever by the retaining pawl 171, the retaining pawl in turn being maintained in effective position by the weight of the cup and its contents which prevents the lever 178 from lifting up. As soon as the customer removes the cup from the seat the lever is lifted by the train of mechanism which is actuated by the spring 163, and the arms 175 being removed from the path of the pin 174 the lever 161 is permitted to swing forward and close the door.

It will be noted that the slots in links 159 and 160 are longer than the width of the lever 161, thus allowing the lever some lost motion. The purpose of this lost motion is to enable the spring to actuate the lever 178 and lift it to its erect position before any of the energy of the spring is needed to actuate the doors. In order to prevent the doors slamming a fluid dash pot is provided for retarding the movement of the lever 161. This comprises a cylinder 185 pivotally attached to the base 36 at 186 having a piston 187 connected to one arm of a bell crank 188 journaled at 189. The other arm of the bell crank is connected to a stud 190 carried by the lever 161. This dash pot may be constructed in either of two ways: It may be made with a valveless piston so as to retard the movement of the lever in both directions, or it may have a valve which will allow the liquid to pass the piston without restraint upon the rearward movement of the lever and retard the movement of the piston upon the forward movement of the lever. Fluid dash pots being in common use it is deemed unnecessary to describe the dash pot in further detail or to illustrate its construction.

Fig. 18 illustrates a modification of the lever 178. In this case the link 176 is connected to the lever 178 below instead of above its axis 179, and the axis 179 is placed near the rear of the compartment 147 instead of close to the door as in the construction previously described. This construction has certain advantages over the other. In the construction previously described, if the customer lifts his cup from the seat but is rather slow in removing it from the compartment, it is possible that the doors may be released and come to before the cup is beyond the reach of the door, in which case the door might strike the cup. In the modified construction, although the cup be lifted a considerable distance from the seat, it cannot be lifted far enough to release the lever 161 without coming into collision with the spout; and since the cup is almost entirely out of the compartment before the lever can escape from the cup, it follows that unless the customer deliberately holds the cup partly in the compartment he cannot fail to get it out of the path of the door before the door closes.

The cup dispensing mechanism will now be described: The portion of the upper base 62 which constitutes the ceiling of the compartment 147 is provided with a circular aperture 200. Surrounding this aperture is an expansible ring consisting of four arms 201, mounted to rock on sleeves 202, carried by the base 62. These sleeves surround screws 203 which pass through a plate 215 and screw into the plate 62. Rollers 205 are mounted to rotate on the sleeves 202, these rollers acting as guides for an operating ring 206 (see more particularly Fig. 19). Each of the arms 201 is provided with a cam shaped edge 207, and projecting downward from the ring 206 are studs 208 which, when the ring is moved clockwise as seen in Fig. 19, are adapted to bear against the cam shaped edges 207 and swing the arms inward, thereby contracting the ring. The cam shaped edges merge into concentric edges 209; that is, edges which are concentric when the ring is contracted, and continued clockwise movement of the ring causes the studs 208 to engage the concentric edges 209, thereby preventing expansion of the ring but contracting it no further. The type of cup used is best illustrated in Fig. 2 where it is seen that the cup is frusto conical in form and has an outwardly extending flange or lip 210, this portion of the cup being best illustrated in Fig. 22. The parts are so proportioned that when the ring is contracted the body of the cup may pass through it but the lip may not. This is illustrated in Fig. 22 where it is seen that the nested stack of cups is suspended by the lip of the lower cup resting on the arms 201, which are in their inward position; i. e., the studs 208 in the operating ring bearing against the concentric edges 209. Each of the arms is provided with an inner cam shaped edge 211, which, when the operating ring is rotated counterclockwise, it being assumed that the ring is moving in this direction in Fig. 19, is engaged by the studs 208 and thereby swung outward far enough to permit the lip 210 to pass through the ring. Joining the edges 211 are concentric edges 212; that is, these edges 212 are concentric when the ring is expanded. Having expanded the ring, continued movement of the operating ring 206 causes the studs 208 to traverse the concentric edges 212 thereby holding the ring expanded but without expanding it further.

A second set of arms 201 is journaled on sleeves 202 above the operating ring 206. These arms are exactly the same as the lower ones, but are inverted so that they extend in the opposite direction from the sleeves on which they are journaled from the lower arms. Projecting upward from the operating ring 206 is a second set of studs 208. These studs are located in the same position radially as the downwardly extending studs, but are considerably removed therefrom arcually. Fig. 20 shows both sets of arms in position, and the relative position of the studs is such that when the operating ring 206 is rotated clockwise the following sequence of operation is obtained: Assuming the parts to be in the position shown in Figs. 21 and 22, wherein the operating ring has been moved to the limit of its clockwise stroke, the lower ring being contracted and the upper one expanded, movement of the operating ring counterclockwise will first move the upper studs 208 away from the edges 212 of the upper set of arms and bring them into engagement with the cam shaped edges 207 of the upper arms, continued movement in this direction contracting the upper ring. While this portion of the operation has been taking place, the lower studs 208 have been traversing the concentric edges 209 of the lower arm. About the time the upper studs pass from the edges 207 to the edges 209 of the upper ring the lower studs reach the inner cam shaped edges 211 of the lower ring and acting thereon expand the lower ring, the studs finally passing from the edges 211 to the concentric edges 212 which they traverse but a short distance. The upper studs have meanwhile traversed the upper concentric edges 209 and maintained the upper ring in contracted position. Rotating the operating ring clockwise from its present position brings about a converse sequence of movements; that is, the lower studs pass from the inner concentric edges 212 to engagement with the outer edges 207 and contract the lower ring during the first stage of the movement. Next, the upper studs engage the edges 211 and expand the upper ring, the studs finally passing to the inner concentric edges 212 whereby the upper ring is held in expanded position, the lower studs being meanwhile in engagement with the lower concentric edges, whereby the lower ring is held in contracted position. From the foregoing it is seen that at no time will both rings be expanded. On the contrary, each ring is contracted and locked in contracted position before the other ring is expanded.

The operating ring 206 is provided with an arm 213 which is connected by a link 214 to the sliding member 115. The normal position of the sliding member 115 is toward the front of the machine, it being shown in this position in Figs. 7 and 15. When in this position the operating ring 206 is in the position shown in Figs. 21 and 22, the lower ring being contracted and the upper expanded. A guard plate 215 is arranged to cover the cup dispensing mechanism and is held in place by screws 203. This ring rests on the upper ends of the sleeves 202 which leaves the arms 201 and the parts associated with them free to move. The guard plate carries a tubular cup guide 216. This guide is cylindrical but is provided with a vertical slot at the front of the machine which exposes the stack of cups to view. The hood 40 is provided with a window 217 through which, and the slot referred to, the stack of cups may be seen. The cups are nested as in Fig. 22 and the stack is normally supported by the lip of the lower cup resting on the lower ring. When the crank is rotated clockwise to the limit of its stroke the sliding member 115 is moved rearwardly in the manner previously described. Through the medium of the link 214 the operating ring 206 is rotated counterclockwise, contracting the upper ring and subsequently expanding the lower ring. The upper and lower rings are separated substantially the same as the distance between the lips of adjacent cups in the stack, and when the upper ring is contracted it comes into position beneath the lip of the second cup from the bottom. After the lower ring is expanded the stack of cups is suspended by the upper ring only. The bottom cup is now suspended by friction between itself and its neighbor and may be readily detached therefrom. It will be remembered that at this time, that is, when the crank has been moved clockwise to the limit of the stroke, the piston of the pump has been lifted and the cylinder is full of liquid. The customer now detaches the bottom cup and sets it on the seat under the spout; he then returns the handle to normal position, thereby operating the pump and filling the cup with liquid. The door is prevented from closing by the cup resting on the seat which prevents the lever 178 lifting to its erect position. The customer now removes the cup from the compartment, thus liberating the lever 178 and allowing the door closing mechanism to operate. Under the control of the dash pot the door closes gently and noiselessly and is securely locked by the toggles.

One feature which I believe to be unique in cup dispensing devices is this: When the crank has perfected the first half of its cycle of operation, that is, when it has been turned clockwise to the limit of its throw, and the stack of cups is sustained by the upper expansible ring the lowermost cup is sustained by friction between itself and its neighor as above described. Depending upon the character of the surfaces of the cups adhesion may contribute more or less to the support of the lower cup at this time; but however this may be, in case the customer does not remove the cup from the stack but chooses to set another cup under the spout the bottom cup remains in position where as the crank 100 is returned to normal position the lower ring will come into position below the lip of the bottom cup and again assume the duty of supporting the entire stack when the upper ring expands. The difference between what has now occurred and what would have occurred had the customer removed the bottom cup is this: The bottom cup having been removed, the stack drops from the upper ring to the lower ring as the crank returns to its normal position; but when the customer fails to remove the bottom cup the stack does not drop, since the lower ring will have come into position below the lip of the bottom cup while the stack is still sustained by the upper ring under the lip of the next cup above so that when the upper ring expands the stack of cups remains stationary. In like manner the lip of the bottom cup will resume its duty of supporting the stack and matters will return to status quo as often as the crank is operated without removing the bottom cup at the time when it is removable.

Fig. 23 illustrates a modification of the cup dispensing mechanism wherein an arm of the lower ring and an arm of the upper ring are made integral; that is, each upper arm 220 is integral with a lower arm 221, the latter being pivotally attached to the base 62 at 222, and the former being raised from the plane of the latter by an offset 223. By this arrangement the arm 220 occupies a plane corresponding to the upper arms of the previously described mechanism, and the arm 221 occupies a plane corresponding to the plane of the lower arms thereof. The arms are moved inward and outward by studs carried by an operating ring 206 in substantially the same manner as has already been described. The principal difference between this structure and the one previously described is that the upper and lower arms move in unison so that, while one ring is expanding the other is contracting, and vice versa. This brings about a condition where both rings are contemporaneously half expanded, and reduces somewhat the hold upon the lips of the cups. With the previously described device, wherein each ring is fully contracted before the other begins to expand, it is quite impossible to detach a cup from the stack whose lip is above a contracted ring. It has been found that a cup cannot be removed without its being destroyed. In order to secure equal safety with the modified construction just described, it is necessary to enlarge the lips of the cups somewhat.

For the purpose of draining the ice chamber a tube 225 is inserted in the bottom thereof. This tube is closed by a plug 226 attached to a rod 227 which passes through guides 228 and extends upward to the base plate 36. When the base plate is resting on the supporting lugs 39 it practically rests on the rod 227 and prevents the plug 226 from being pushed upward should any person attempt to do so. It is conceivable that some mischievous boy might open the door of the discarded cup receptacle and push the plug 226 upward, allowing the water to drain from the ice chamber and flood the area around the machine. The arrangement just described effectually prevents this.

It is not to be understood that my invention is limited to the particular construction disclosed, as various modifications may be made while remaining within the extent and scope of the claims.

What I claim is as follows:

1. In a vending machine, an enclosure having a door, a delivery device therein, means whereby said device is operated to deliver that which it is intended to deliver, and means whereby the door of the enclosure is opened during a portion of a cycle of operation of said operating means, automatic means for closing the door, and means for preventing operation of said means till after the completion of said cycle of operation.

2. In a vending machine, an enclosure having a door, a delivery device therein, means for operating said device to deliver that which it is intended to deliver, means whereby the door is opened during a portion of a cycle of operation of said operating means, automatic means for closing the door, and means for preventing the door closing until the purchase has been removed from the enclosure.

3. In a vending machine, an enclosure having a door, a delivery device therein, an operating member whereby said device is made to deliver, completion of the delivery requiring a complete cycle of movement of the operating member; means whereby the door is opened during the movement of the operating member, a spring to close the door, and means for preventing the spring closing the door till the purchase has been removed from the enclosure.

4. In a vending machine, an enclosure having a door, a liquid dispensing spout therein, an operating member and means operated thereby, whereby liquid is caused to flow from the spout, means whereby the door is opened during a portion of a cycle of operation of said member, a seat under the spout for a cup, means for closing the door after such action of the operating member as is necessary to cause a given quantity of liquid to flow from the spout, and means which prevents the operation of the door-closing means till the cup has been removed from the seat.

5. In a vending machine, a compartment having a door, a liquid dispensing device with a spout in the compartment, an operating member whereby the dispensing device is made to discharge liquid from said spout into a cup placed under the spout, automatic means for closing the door, and automatic means for postponing the operation of said door closing means till the cup containing the liquid has been removed from the compartment.

6. In a vending machine, a compartment having a door, a liquid dispensing device having a spout located in the compartment in a situation permitting a cup to be set underneath it, a manually operated member whereby the liquid dispensing device is actuated, said device being so constructed that it will discharge liquid from the spout only so long as movement of the operating member continues; means for opening the door, automatic means for closing it, said means being potential when the movement of the operating member is completed, and automatic means for postponing the operation of said door closing means till the cup containing the liquid which has flowed from the spout has been removed from the compartment.

7. In a vending machine, an enclosure having a door which is normally closed, a stack of cups therein, an operating member, means whereby the door is opened when said member is operated, and means operated by said member whereby one cup and one only from the stack is released each time the door is opened.

8. In a vending machine, an enclosure having a door which is normally closed, means for suspending a nested stack of cups in said compartment, means for releasing the lower cup each time the door is opened, so that it may be detached from the stack, and means for securing the next cup so that it cannot be detached the next time the door is opened.

9. In a cup dispensing device, two expansible rings arranged one above the other, each adapted when contracted to encircle and support a cup by affording a support for the flange or lip surrounding the upper edge of the cup, and when expanded to allow the cup, lip and all, to pass therethrough, the rings being spaced apart a distance about equal to the distance between the lips of adjacent cups, so that when a nested stack of cups is supported by the lower ring the upper ring is in a position to assume the support of all but the lower cup by being contracted below the lip of the next cup above; and means for expanding and contracting the rings.

10. In a cup dispensing device, two expansible rings arranged one above the other, each adapted when contracted to encircle and support a cup by affording a support for the flange or lip surrounding the upper edge of the cup, and when expanded to allow the cup, lip and all, to pass therethrough, the rings being spaced apart a distance about equal to the distance between the lips of adjacent cups, so that when a nested stack of cups is supported by the lower ring the upper ring is in a position to assume the support of all but the lower cup by being contracted below the lip of the next cup above; and means for expanding and contracting the rings, said means always contracting one ring before expanding the other.

11. In a cup dispensing device, two expansible rings arranged one above the other, each adapted when contracted to encircle and support a cup by affording a support for the flange or lip surrounding the upper edge of the cup, and when expanded to allow the cup, lip and all, to pass therethrough, the rings being spaced apart a distance about equal to the distance between the lips of adjacent cups, so that when a nested stack of cups is supported by the lower ring the upper ring is in a position to assume the support of all but the lower cup by being contracted below the lip of the next cup above; said rings being set around a hole in the bottom of a closed receptacle, so that the stack of cups extends through said bottom; and means for expanding and contracting the rings, always contracting one before expanding the other, thereby releasing the cups one by one and allowing the stack to drop from the upper to the lower ring by contracting the lower and expanding the upper ring after the bottom cup has been removed.

12. In a cup dispensing device, two expansible rings arranged one above the other, each adapted when contracted to encircle and support a cup by affording a support for the flange or lip surrounding the upper edge of the cup, and when expanded to allow the cup, lip and all, to pass therethrough, the rings being spaced apart a distance about equal to the distance between the lips of adjacent cups, so that when a nested stack of cups is supported by the lower ring the upper ring is in a position to assume the support of all but the lower cup by being contracted below the lip of the next cup above; said rings being set around a hole in the bottom of a closed receptacle, so that the stack of cups extends through the bottom, said bottom constituting the top of another enclosure, having a door; an operating member, means whereby during a portion of a cycle of operation thereof the door is opened, the upper ring contracted and the lower one then expanded, thus leaving the lower cup supported only by friction between itself and its neighbor, and means whereby during the remainder of the cycle of operation of said member the lower ring is contracted, the upper one then expanded, thus allowing the stack of cups to drop to the lower ring, and the door closed.

13. In a cup dispensing device, two expansible rings, each consisting of a plurality of segmental pivoted arms, one ring being mounted above and the other below an operating ring, said ring being arranged to rotate on its own axis a limited distance; and studs in said ring whereby when the ring is rotated in one direction the upper arms are swung outward and the lower ones inward, and when the ring is rotated in the opposite direction the arms are affected conversely.

14. In a cup dispensing device, two expansible rings each consisting of a plurality of independent segmental pivoted arms, an operating ring interposed between said rings, having studs whereby when it is rotated on its own axis a certain distance the arms of one ring are swung toward each other, thus contracting the ring, further rotation then moving the arms of the other ring outward, thus expanding the ring, rotation of the ring in the opposite direction contracting the latter ring and subsequently expanding the first.

15. In a vending machine, a compartment having a door, an operating shaft, an operating connection between the shaft and door whereby the latter is opened during the early portion of a cycle of operation of the shaft, a spring adapted to close the door when the shaft has completed the cycle, a seat for a cup, a lever adapted to be retained in a given position by a cup standing on the seat, and mechanism whereby said lever is enabled while thus held to prevent the spring closing the door.

16. In a vending machine, a compartment having a door, an operating shaft, a cam thereon and a lever operated in one direction by the cam, a toggle connection between the door and lever whereby the door is opened and closed by movement of the lever and locked when the lever is in normal position; a spring for moving the lever to said normal position, a retaining pawl whereby the lever is held in opposition to the spring and the door kept open, and a controlling lever connected to the pawl and whereby it is enabled to oppose the spring, the connection being such that a very slight power is sufficient to hold the controlling lever.

17. In a vending machine, a compartment having a two part segmental door, said parts being mounted to oscillate on a common center, a toggle whereby said parts are oscillated away from and toward each other and locked in the latter position, a lever connected to the knuckle of the toggle, means for moving the lever to break the toggle and open the door, a spring for moving the lever to restore the toggle and close and lock the door, a retaining pawl whereby the lever is held in the open-door position, a controlling lever, and a connecting link whereby the retaining pawl and controlling lever are connected, said link having a very small leverage on the controlling lever when the door is open, thereby enabling the controlling lever to be restrained and the door kept open by a very slight power.

18. In a vending machine, a compartment having a two part segmental door, said parts being mounted to oscillate on a common center, a toggle whereby said parts are oscillated away from and toward each other and locked in the latter position, a lever connected to the knuckle of the toggle, means for moving the lever to break the toggle and open the door, a spring for moving the lever to restore the toggle and close and lock the door, a retaining pawl whereby the lever is held in the open-door position, a controlling lever, a connecting link whereby the retaining pawl and controlling lever are connected, said link having a very small leverage on the controlling lever when the door is open, thereby enabling the controlling lever to be restrained and the door kept open by a very slight power, and a fluid dash pot whereby the movement of the door is controlled.

19. In a vending machine, a compartment having a door, an operating member, means whereby the door is opened during the early part of a cycle of operation of said member, to permit the article purchased to be removed from the compartment, a spring for closing the door at the completion of the cycle, means for preventing the spring acting till the purchase has been removed from the compartment, and a fluid dash pot to retard the movement of the door.

20. In a vending machine, an enclosure having a door, a spout in the compartment, a seat for a cup under the spout, an operating member, means whereby during the early part of a cycle of operation of said member the door is opened, a spring adapted to close the door when the operating member has completed its cycle of operation, a lever pivoted below the seat and lying in a groove in the seat when the door is open so that a cup on the seat may hold the lever down, and connecting means between the lever and door whereby the tendency of the spring to close the door also tends to lift the lever, said connection being of such a nature that the lifting tendency on the lever is so slight that the cup with a small quantity of liquid in it can hold the lever down.

21. In a vending machine, an operating member, a full stroke device whereby said member is prevented from moving in either direction until it has completed its stroke in the opposite direction, means for adjusting said device to various lengths of stroke, a stop to limit the stroke of said member, and means whereby adjustment of the full stroke device also adjusts the stop commensurately.

22. In a vending machine, an oscillatory shaft, a toothed disk thereon, the teeth extending only partially around the disk, a stationary pawl adapted to engage the teeth thereof and prevent reversal of the motion of the shaft until the last tooth has passed the pawl, said disk comprising two plates, one of which is rigidly secured to the shaft, the other being secured to the first, each part having teeth, means for advancing or retracting the latter plate with reference to the first, so that more or less teeth must pass the pawl before the shaft can be reversed, and a stop lug carried by said latter plate whereby the stroke of the shaft is limited to a distance commensurate with the length of stroke for which the plates are adjusted.

23. In a cup dispensing device, two independently movable sets of members arranged to surround a stack of nested cups, one above the other and separated a distance approximately equal to the distance from cup to cup in the stack, each set adapted when its members are in one position to support the stack by affording a rest for a lip formed on the upper edge of each cup, and when its members are in another position to let the cups pass between them; and means for moving either set to either its supporting or non-supporting position while the other set remains stationary in supporting position.

24. In a cup dispensing device, two sets of members arranged to surround a stack of nested cups, one set above the other and separated a distance approximately equal to the distance from cup to cup in the stack, each set adapted to support the stack by providing an annular rest for a lip formed on the upper edge of each cup when its members are in one position, and when its members are in another position to allow the cups to pass between them; and means for moving either set to either its supporting or non-supporting position while the other set remains stationary in supporting position.

25. In a vending machine, an enclosure having a door, means for mounting a stack of nested cups so that the lower end of the stack is in the compartment in such position that when the door is open the customer may insert his hand in the compartment, grasp the outside cup and remove it from the stack; means for securing the second cup in the stack, so that it cannot be removed, notwithstanding it is as accessible to the customer's grasp as the first after the first has been removed; means for releasing the second cup when by the removal of the bottom cup it has itself become the bottom one, so it can be removed by the customer as was the first one, and securing the next cup, now the second, so it cannot be removed; and means whereby the aforesaid means are correlated to the opening and closing of the door, to the end that one cup and one only is released and may be removed each time the door is opened.

26. In a vending machine, means for mounting a stack of nested cups so that the bottom cup may be grasped by the customer and separated from the second cup; means for securing the second cup so it cannot be removed, although after the removal of the first one it is substantially as accessible to the customer as the first one was, while leaving the bottom one free to be removed; means for releasing the second cup after the bottom one has been removed, said second cup now having become the bottom one, and for securing the next cup, now become the second, so it cannot be removed, again leaving the bottom one subject to removal; and means whereby the removal of a cup is prevented during the period when the bottom cup is being released and the second one secured.

27. In a vending machine, means for mounting a stack of nested cups so that the bottom cup may be grasped by the customer and separated from the second cup, means comprising an expansible ring which surrounds the exposed part of the second cup and secures it against removal, while leaving the bottom cup free to be removed; means, comprising expansion of the ring so the second cup, now become the bottom one, can pass through it, whereby the stack is allowed to drop sufficiently to permit the ring, when it is again contracted, to secure the next cup, and means for contracting the ring.

28. In a cup dispensing device, two expansible rings arranged one above the other and adapted to encircle a stack of nested cups, the rings being spaced apart a distance about equal to the distance between the lips of adjacent cups in the stack; each ring comprising a plurality of segmental members arranged for movement toward or from the cups, thereby contracting or enlarging the diameter of the ring, the portion of each member which confronts the cups being concentric to a point within the ring; and means for moving the members to or from the cups.

29. In a cup dispensing device, two expansible rings arranged one above the other and adapted to encircle a stack of nested cups, the rings being spaced apart about equal to the distance between the lips of adjacent cups in the stack; each ring comprising a plurality of segmental members arranged for movement toward or from the cups, thereby contracting or enlarging the diameter of the ring, the portion of each member which confronts the cups being concentric to a point within the ring; an operating ring arranged to oscillate on its own axis, and an operative connection between the ring and the aforesaid members, whereby when the operating ring is rotated in one direction the members of one ring are moved inward and those of the other ring moved outward and when the operating ring is rotated in the opposite direction the members of the rings are affected conversely.

30. In a cup vending device, two expansible rings arranged one above the other and adapted to encircle a stack of nested cups, the rings being spaced apart a distance about equal to the distance between the lips of adjacent cups in the stack; each ring comprising a plurality of segmental members arranged for movement toward or from the cups, thereby contracting or enlarging the diameter of the ring, the portion of each member which confronts the cups being concentric to a point within the ring; means for moving the members of each ring in and out, and means whereby the members of either ring are always moved in before those of the other ring are moved out, to the end that at least one of the rings is always in a state of contraction.

31. In a cup dispensing device, two expansible rings arranged one above the other and adapted to encircle a stack of nested cups, the rings being spaced apart a distance about equal to the distance between the lips of adjacent cups; each ring comprising a plurality of members arranged for movement toward or from the cups, thereby contracting or enlarging the ring; means for moving the members of each ring simultaneously in or out, and means whereby the members of either ring are kept stationary while the members of the other ring are moving.

32. In a cup dispensing device, a plurality of elements arranged around a stack of nested cups and adapted to move toward and from the cups, moving in paths which if continued would lead through the walls of the cups, said elements forming two groups, one above the other; and means for moving the members of each group toward or from the cups.

33. A machine for dispensing cups from a nested stack thereof, comprising two sets of devices arranged one above the other, one of them capable of affording a rest for the bottom cup of the stack, the other adapted to assume the support of all but the bottom cup by engagement with the exposed part of next to the bottom one; means for moving either set of devices independently of the other so it no longer functions, said means always restoring one set to effectiveness before disabling the other.

34. In a vending machine, a compartment with a door, a spout in the compartment for delivering liquid, a seat below the spout on which to set a cup, means for causing the liquid to flow from the spout into the cup, means for opening the door before the liquid starts to flow, automatic means for closing the door after the cup has been filled with liquid, and means whereby the closing of the door is postponed as long as the cup remains on the seat, but no longer.

35. In a vending machine, a compartment having a door, a spout in the compartment, an operating member, means whereby during the early part of a cycle of operation of said member the door is opened, a spring adapted to close the door when the operating member has completed its cycle of operation, a lever pivoted below the spout, means whereby a cup set under the spout is adapted to prevent said lever swinging upward on its pivot, and connecting means between the lever and door whereby the tendency of the spring to close the door also tends to lift the lever, said connection being of such nature that the lifting tendency on the lever is so slight that the weight of the cup can hold the lever down.

36. In a vending machine having a reciprocating member, a full-stroke device for controlling the movements of said member, comprising a toothed element and a pawl adapted to engage said teeth and prevent premature reversal of movement of the member; said element consisting of two overlapping parts, each carrying a portion of the aforesaid teeth, said parts being arranged to overlap various distances, thereby varying the minimum distance which said member moves.

ROLLYN H. BAKER.